March 22, 1949.    P. Q. R. SCHREIBER    2,464,896
MACHINE FOR CUTTING LEAF TOBACCO AND THE LIKE
Filed Aug. 28, 1944    6 Sheets-Sheet 1

Inventor
P. Q. R. Schreiber,
By
Emery Holcomb & Glenn
Attorneys

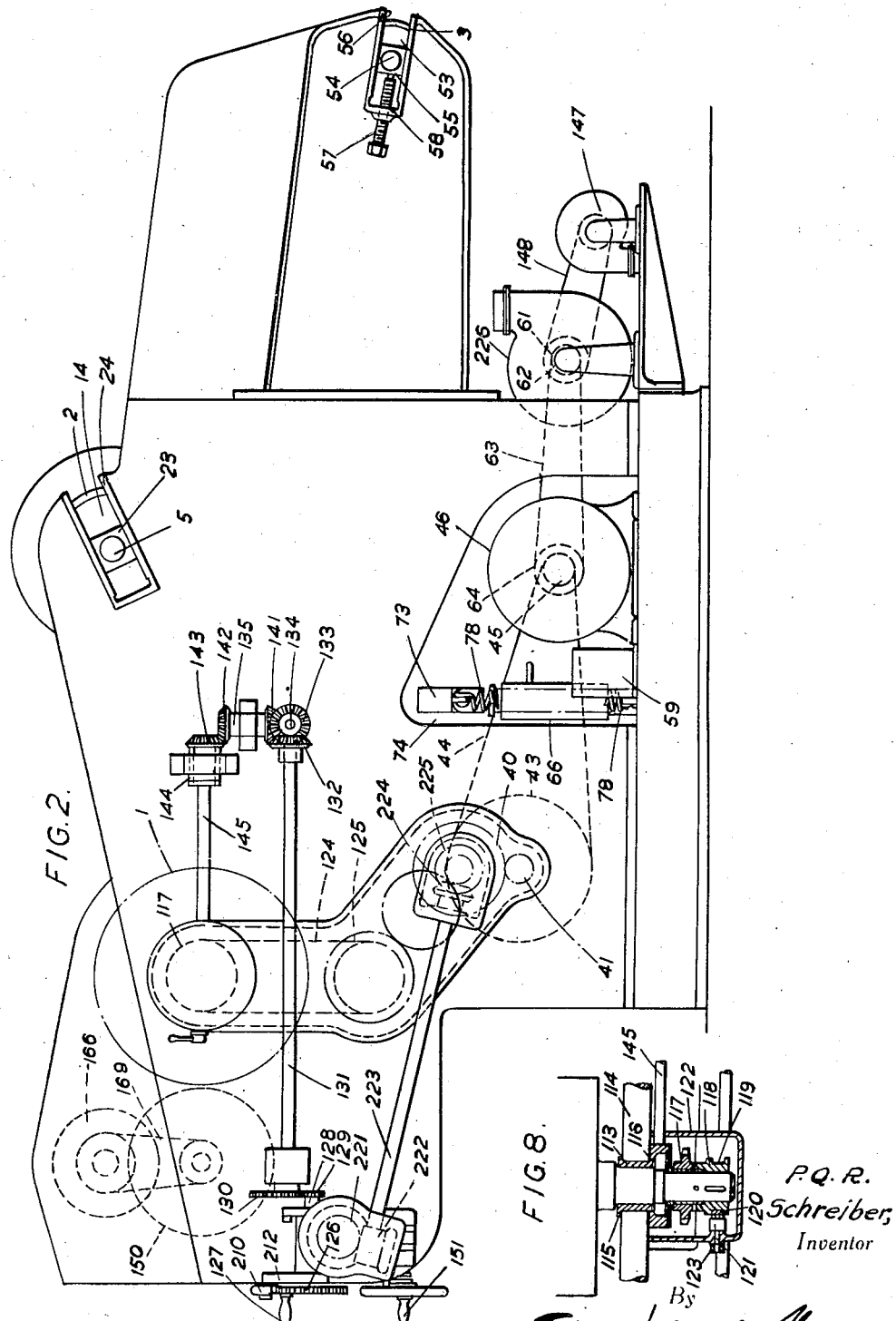

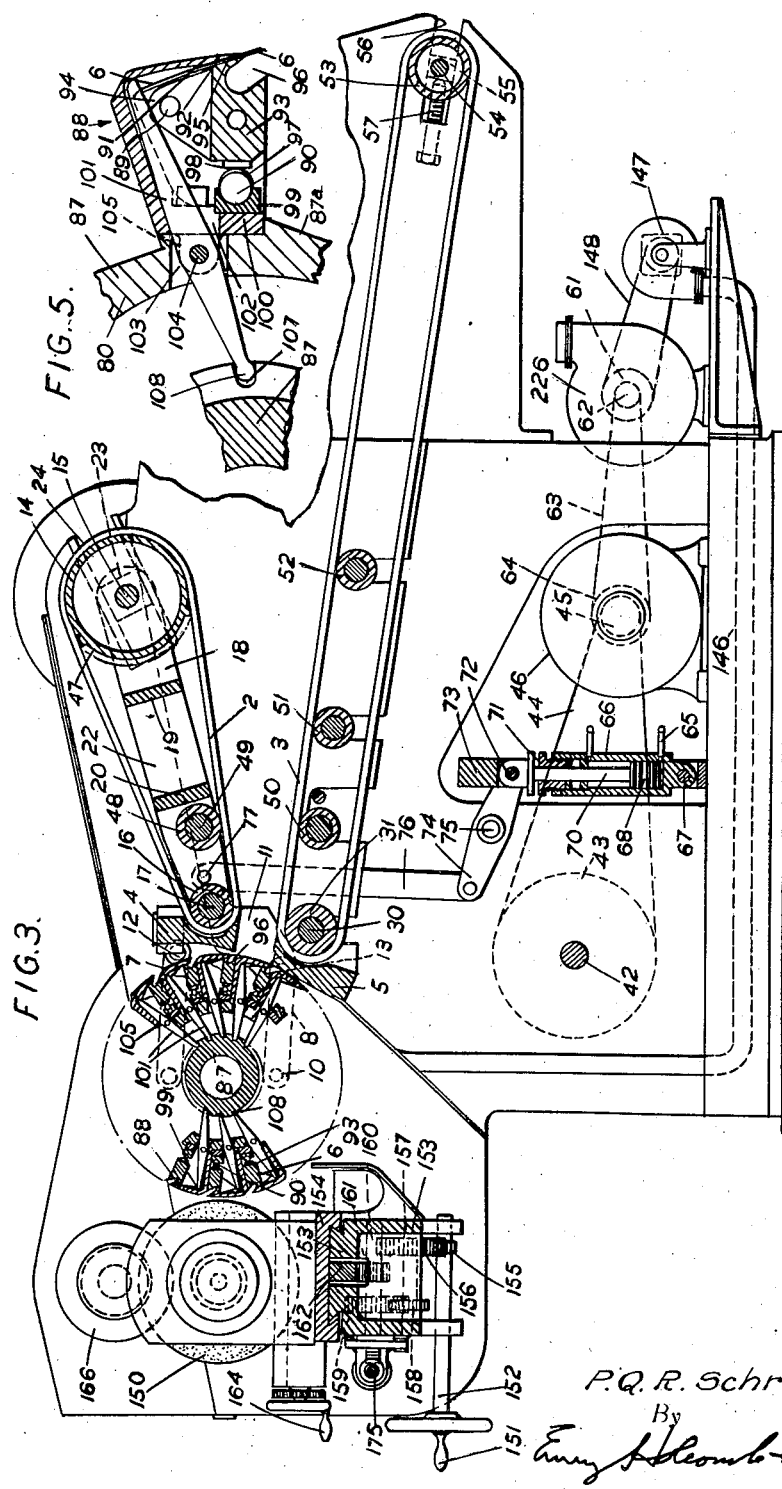

March 22, 1949. P. Q. R. SCHREIBER 2,464,896
MACHINE FOR CUTTING LEAF TOBACCO AND THE LIKE
Filed Aug. 28, 1944 6 Sheets-Sheet 4
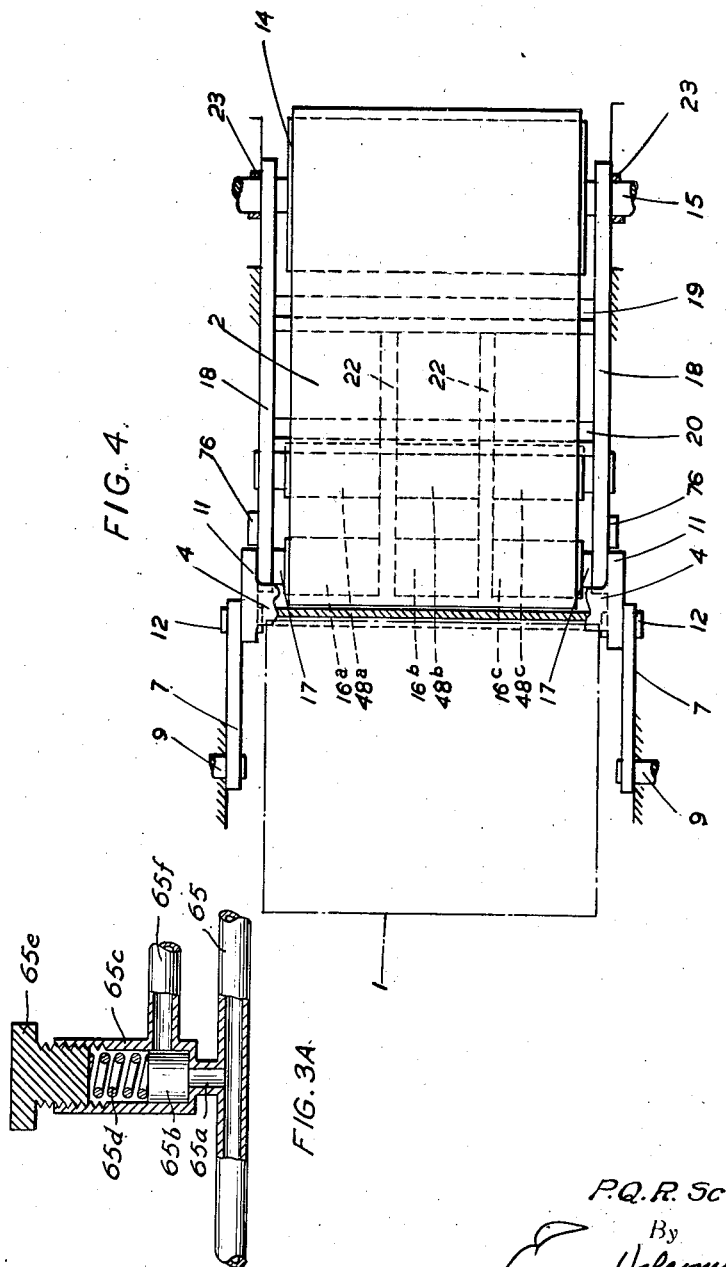
Inventor
P.Q.R. Schreiber,
By
Attorneys March 22, 1949.  P. Q. R. SCHREIBER  2,464,896
MACHINE FOR CUTTING LEAF TOBACCO AND THE LIKE
Filed Aug. 28, 1944  6 Sheets-Sheet 5
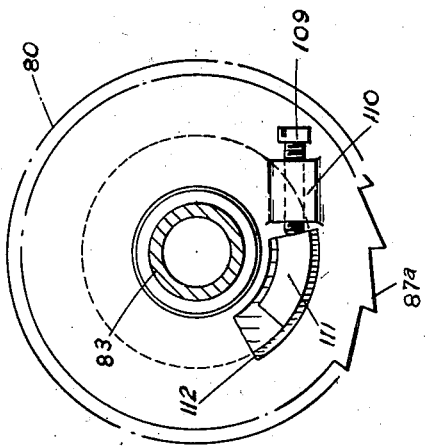
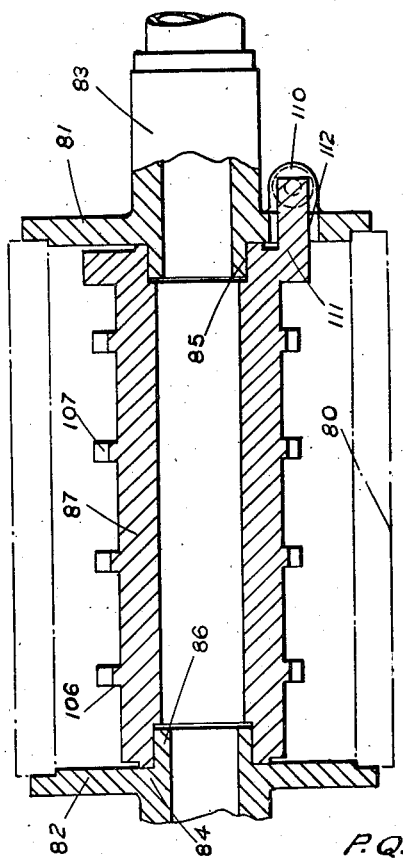
Inventor
P. Q. R. Schreiber,
By
Attorneys

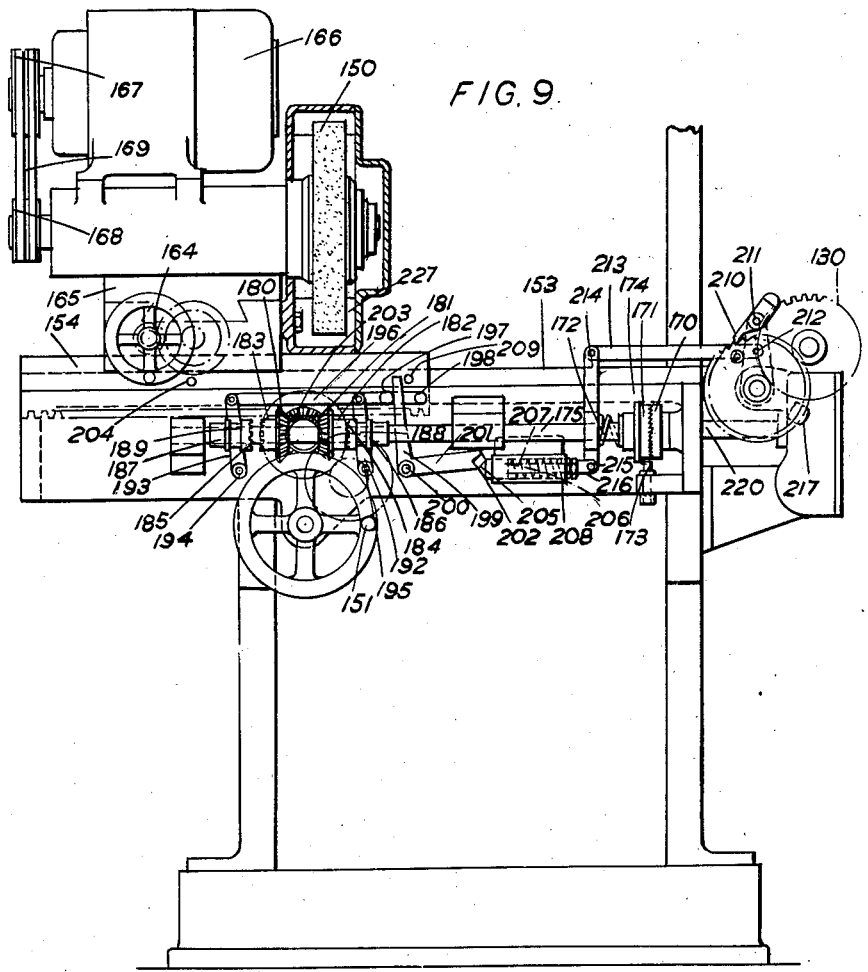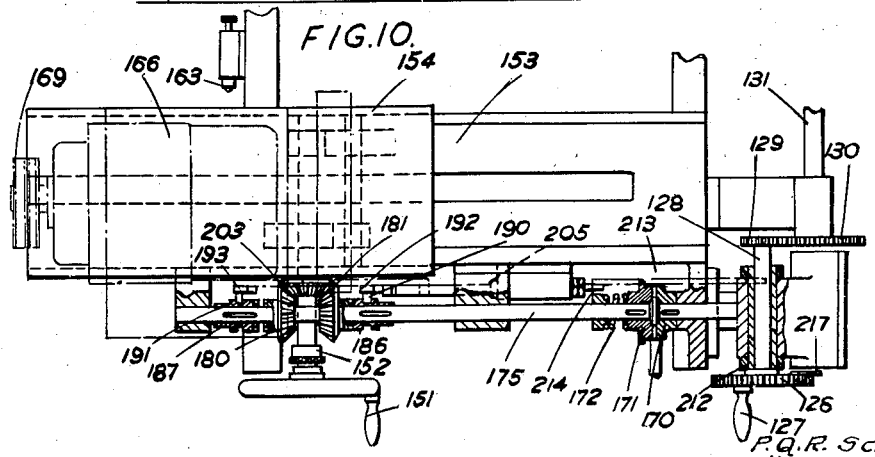

UNITED STATES PATENT OFFICE 2,464,896

MACHINE FOR CUTTING LEAF TOBACCO AND THE LIKE

Patrick Quintin Robert Schreiber, London, England

Application August 28, 1944, Serial No. 551,573
In Great Britain September 18, 1943

10 Claims. (Cl. 146—119)

There are two types of machine for cutting leaf tobacco and like materials. The first is the reciprocating type in which the tobacco is fed in steps towards, and in timed relationship with the movement of, a reciprocating knife. The main disadvantages of this type are that, owing to the periodic motion, high speeds are impossible without excessive vibration, and that the knife can only be used for a very short time in the machine before having to be removed for grinding. Such disadvantages are eliminated in the second type in which a small number, say five, of knives are caused to rotate continuously and uniformly about an axis. At one point in their path the knives pass grinding mechanism so that they are kept sharp while the tobacco is being cut and the machine can be run for substantial periods without stopping. However, certain disadvantages are peculiar also to this type of machine. For example, the arrangement of the grinding mechanism is such that the grinding wheel tends to glaze and has to be dressed continuously and automatically by a diamond. Further, although an extraction fan is used to draw off grinding dust, it is not possible to prevent a certain amount of dust finding its way into the cut tobacco.

One object of the present invention is, therefore, to eliminate the aforesaid disadvantages in regard to the grinding of the knives in a rotary type of machine. This object is achieved by mounting the knife assembly to be moved to-and-fro between a position on one side of the drum in which the tobacco is cut and a position on the other side of the drum in which it is acted on by grinding mechanism. Thus, the cutting of the tobacco leaf is stopped when the grinding takes place but it does not have to be stopped at anything like such frequent intervals as the reciprocating knife type of machine, particularly as a further object of the invention is so to contrive the drum that a large number of knives are mounted thereon, all such knives, of course, being ground in a single grinding operation. It may, at first sight be thought that it would be as easy to cause the grinding mechanism to approach the knife drum as to cause the knife drum to approach the grinding wheel or the like but this is not so. One reason is that it is desirable to grind the knives to a predetermined diameter and to do this it is necessary first to cause them to project slightly beyond the said diameter, which necessitates withdrawing the drum from the mouthpiece through which the tobacco is fed.

It has already been mentioned that a particular object of the invention is to construct the drum with a large number of knives. It is desirable for not more than one knife to be in engagement with the tobacco at any one time and, therefore, in an example where the maximum height of the tobacco being cut is three inches, the knives are slightly more than three inches apart. A further advantage of using a large number of knives is that a low cutting speed can be obtained for a substantial output of tobacco.

In tobacco leaf cutting machines the tobacco is fed to the cutting appliance through a mouthpiece defined by upper and lower jaws and it is advantageous to mount one of the jaws so that it can yield. Hitherto such a jaw has been loaded by weights or springs. Springs have the disadvantage that they exert a changing pressure as their strain changes, while weights are tiresome to adjust and fatigue the operator in moving them about. In neither case can the actual pressure applied to the tobacco be ascertained instantly. When the operator stops the machine for meals it is usual to relieve the pressure on the tobacco and in the case of weights or springs this involves a certain amount of manual labour. Another object of the present invention, therefore, to lod the jaw by hydraulic mechanism which overcomes the aforesaid disadvantages. Such a mechanism can be provided with a pressure gauge that gives an instantaneous indication of the pressure on the tobacco and can be accurately adjusted with great ease.

Further objects of the invention will appear from the ensuing portions of this specification.

In order that the invention may be clearly understood and readily carried into effect, a machine in accordance therewith will now be described by way of example, with reference to the accompanying drawings, in which—

Figure 2 is an elevation of the other side of the machine.

Figure 3 is a vertical section through the machine,

Figure 3A is a sectional elevation of a detail,

Figure 4 is a diagrammatic plan of certain portions of the machine,

Figure 1:
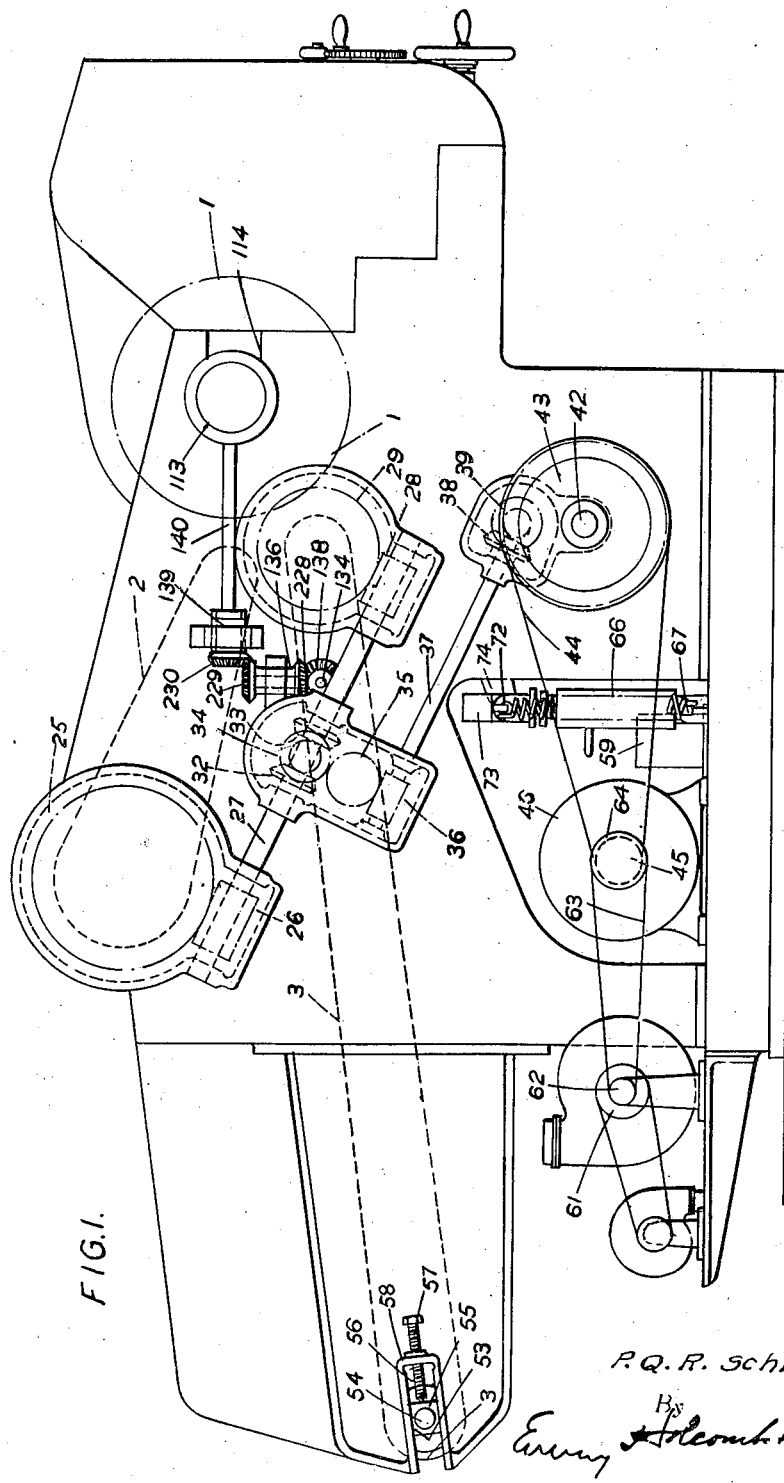
Figure 1 is an elevation of one side of the machine.

Figure 5 is a sectional side elevation of certain details shown on a much larger scale than in the preceding figures, Figure 6 is a sectional plan of an assembly used in the machine, Figure 7 is a sectional end elevation of the assembly appearing in Figure 6, Figure 8 is a sectional plan of further details,
Figure 9 is a sectional rear elevation of another assembly used in the machine, and
Figure 10 is a sectional plan of the assembly in Figure 9.

The tobacco to be cut is fed towards a rotary knife drum, designated generally by the reference numeral 1, by a pair of converging endless feed bands 2 and 3 (see particularly Figure 3). The tobacco leaf is compressed as it is fed forward and, immediately before reaching the knife drum, passes through a mouthpiece defined by an upper jaw 4, mounted for up and down movement, and a lower jaw 5 which is fixed and which serves as a cutting bed with which knives 6, carried by the knife drum, co-operate to sever slices of tobacco from the mass thereof as the drum 1 rotates in clockwise direction as viewed in Figure 3.

It is an essential of good cutting of the tobacco that it should be cut as close as possible to the mouthpiece where the tobacco is under compression; otherwise, the compressed tobacco expands and an uneven width of cut results. Thus, it is desirable for the upper jaw 4 to follow the periphery of the knife drum as it rises and falls. Furthermore, the lower face of the upper jaw should at all times be substantially parallel to, or at a substantially constant angle with respect to, the upper surface of the lower jaw. Therefore, the upper jaw forms part of a parallelogram linkage being mounted at each end on a pair of links 7 and 8. The remote ends of the links 7 are pivoted respectively on journals 9 (Figures 3 and 4) fixed to the machine frame respectively at each end of, and in a vertical plane containing the axis of, the knife drum 1 (when the latter is in its cutting position). The remote ends of the lower links 8 are also pivoted to the machine frame, being mounted on journals 10 (Figure 3) in the aforesaid plane but beneath the axis of the knife drum. The ends of the upper jaw 4 are formed with cheeks 11 carrying journals 12 and 13 for the near ends of the links 7 and 8.

The upper feed band 2 is carried by a driving roll 14, fixed to a driving spindle 15, and a front roll 16 divided into three sections 16a, 16b, and 16c (see Figure 4) freely mounted on a spindle 17. The spacing of the spindles 15 and 17 is maintained constant by a stretcher frame comprising side members 18 journalled on the said spindles and rigidly connected by cross members 19 and 20 to which are rigidly fixed two longitudinal members 22 which project between the sections 16a, 16b and 16c of the front roll 16 and which support the spindle 17.

It will be appreciated that, owing to the fact that the distance between the spindles 15 and 17 is fixed, the spindle 15 must be free to move to-and-fro as the upper jaw 4 rises and falls on the links 7 and 8. Therefore, the spindle 15 is mounted in journal bearings 23 free to slide in guide slots 24 formed in the machine frame. The spindle 15 carries a worm wheel 25 (shown diagrammatically in Figure 1) in mesh with a worm 26 fixed to a shaft 27 which at its other end carries a second worm 28 in mesh with a worm wheel 29 fixed to a spindle 30 (Figure 3) which has rigid therewith a feed roll 31 for the lower feed band 3. The worm wheel 25 can roll slightly on its worm 26 as the spindle 15 of the feed roll 14 for the upper feed band moves to-and-fro as aforesaid.

A pair of bevel gears 32 and 33, shown diagrammatically in Figure 1, are splined to the shaft 27 and either can be caused, at will, to mesh with a bevel gear 34 that rotates continuously during the operation of the machine. Thus, the feed bands 2 and 3 can be caused to feed the tobacco to the knife drum, or they can be reversed so as to clear the machine of tobacco, if this proves to be necessary. The bevel gear 34 is connected by gearing, including a worm wheel 35 and a worm 36, to a shaft 37 carrying a bevel gear 38 in mesh with a bevel gear 39 on a countershaft geared through gears 40 and 41 (Figure 2) to a shaft 42 (Figure 1) carrying a pulley wheel 43 connected by a belt 44 to a pulley wheel 45 driven by an electric motor 46.

The feed bands 2 and 3 are of known construction and it is, therefore, unnecessary to describe them in great detail. They consist of brass slats hinged together and formed on their outer faces with grooves that grip the tobacco. On their inner faces they are shaped to engage teeth formed in their respective driving rolls. Such teeth 47 are shown on the driving roll 14 in Figure 3.

A support roll 48 which backs the lower run of the feed band 2 is carried by a spindle 49 carried by the side members 18 of the stretcher frame. The support roll 48 is, like the front roll 16, divided into three sections 48a, 48b and 48c (Figure 4) separated from each other by the longitudinal members 22. Similar support rolls 50, 51 and 52 are carried by the machine frame and back the upper run of the lower feed band 3. The various support rolls enable the feed bands to react against the pressure of the tobacco as this is compressed between the converging feed bands.

The lower feed band 3 extends backwards to a roll 53 mounted on a spindle 54 carried by journal bearings 55 located in slots 56 in the machine frame. The tension in the feed band 3 tends to cause the journal bearings 55 to slide forwards in the slots 56 but their movement is limited by adjustable stops in the form of bolts 57 screwed into flanges 58 (on the machine frame) that define the ends of the slots 56.

It will be recalled that the upper jaw 4 is free to rise and fall. However, a downward thrust on the jaw is necessary to maintain the required pressure on the tobacco. This pressure is furnished hydraulically, oil being pumped from a reservoir (not shown) by a small high speed triple ram oil pump, indicated diagrammatically at 59 in Figure 2. The oil is delivered through an inlet 65 to a cylinder 66 pivoted at 67 to the base of the machine frame. The oil pressure tends to lift a piston 68 carried by a ram 70 that passes through a gland 71 at the top of the cylinder 66 and is pivoted at 72 to a cross-head 73 which extends across the machine and has pivoted respectively at its ends two-armed levers 74 which, in turn, are pivoted at their centres on trunnions 75 carried by the machine frame. At its forward end each lever 74 is pivoted to an upwardly extending link 76 pivoted at 77 to the adjacent one of the side members 18 of the stretcher frame. The cross-head 73 is urged downwards and the jaw 4 upwards against the hydraulic pressure by two helical tension springs 78, one on each side of the cylinder 66, connected between the cross-head and the base of the machine. The pressure beneath the piston 68 in the cylinder 66 is determined by an adjustable automatic spring-loaded relief valve (Figure 3A) through which excess oil is returned to the reservoir. The relief valve may take many different forms of which that shown in Figure 3A is an example. This relief valve is connected by a pipe 65a to the inlet 65 and comprises a piston 65b mounted to slide in a cylinder 65c and loaded by a spring 65d interposed between the piston 65b and an abutment member 65e, screwed into the top of the cylinder 65c. When the pressure in the inlet pipe 65 reaches a predetermined value, the piston 65a is lifted against the spring 65d so as to uncover a port 65f through which the oil can escape to the reservoir. The extent to which the abutment 65e is screwed into the cylinder 65c determines the stress in the spring and, therefore, the oil pressure at which the port 65f is uncovered. If the amount of tobacco being fed through the machine is constant, the piston 68 remains stationary while all the oil delivered by the pump is by-passed through the relief valve back to the reservoir. A constant pressure is then exerted on the tobacco, according to the setting of the relief valve. If, on the other hand, the amount of tobacco becomes greater or less, the piston 68 falls or rises while more or less oil is by-passed through the relief valve. If, at any time, it is desired to relieve the pressure on the tobacco, the relief valve is fully opened so that the oil drains from the cylinder 66 and the springs 78 lower the cross-head 73 while raising the jaw 4.

The knife drum is a composite structure comprising, as shown in Figures 6 and 7, a main drum member 80 mounted between end pieces 81 and 82 formed respectively with journals 83 and 84 by which the drum is rotatably mounted in the machine frame. Projecting inwardly from the end pieces 81 and 82 are spigots 85 and 86 which support an inner drum member 87. The latter is rotatably mounted on the spigots 85 and 86 but is normally caused, by means to be described presently, to rotate as a unit with the other portions of the drum. The outer surface of the main drum member 80 is formed, as shown, for example, in Figure 7, with a series of tangential flat surfaces 87a. As clearly shown in Figures 3 and 5, a knife support 88 is fixed to each of the surfaces 87a, each support being a trough-shaped member extending substantially the whole width of the drum and being closed at each end by plates which carry a spindle 89 and an eccentric shaft 90.

Each of the knife supports 88 carries one of the knives 6, the front wall 91 of each support 88 being formed with a surface 92 (Figure 5) against which the associated knife 6 is clamped at the required cutting angle with respect to the drum. The clamping is effected by a member 93 carried inside the support 88 by the spindle 89 upon which it is pivotally mounted through the medium of lugs 94 integral with the clamp member 93. The outer face of the latter is formed with a clamp surface 95 corresponding to the surface 92. Just behind the surface 95 the clamp member 93 is formed with a longitudinal recess 96 which the mass of tobacco enters as it is severed by the knife 6 sweeping past the mouthpiece defined by the jaws 4 and 5. The clamp member 93 is maintained firmly in engagement with the knife 6 by means of the aforesaid eccentric shaft 90 which is formed with the eccentrics 97 which, in the operative position of the shaft 90, are wedged against surfaces 98 on the inner face of the clamp member 93. To support the radial thrust on the eccentric shaft 90, half bearing blocks 99 are interposed between the shaft 90 and the back wall 100 of the knife support 88, these bearing blocks 99 being distributed along the shaft and located between the eccentrics 97.

The mounting of each knife is such that, on entering the tobacco, it does not make contact therewith simultaneously at all points along its edge but is set at a very slight angle so that the knife enters the tobacco progressively along its edge. The upward thrust on the knife is opposed by four two-armed levers 101, distributed along the knife, each of which project through an associated one of four apertures 102 in the back wall 100 of the knife support 88 and through a corresponding aperture 103 in the adjacent portion of the main drum member 80. The lever is pivoted at 104 inside the aperture 103 upon lugs 105 projecting from the back wall 100.

It will be appreciated, therefore, that there are four levers 101 associated with each knife 6, and the various levers are distributed round the inner drum 87 in four separate planes, each plane containing one of the levers for each knife 6. In each such plane the inner drum 87 is formed with a peripheral ring 106 and each such ring is formed with a series of slots 107 which respectively receive the inner ends 108 of the associated two-armed levers 101. The four peripheral rings 106 appear in section in Figure 6 and the engagement of one of the slots 107 with the associated two-armed lever 101 appears clearly in Figure 5.

When the cutting edges of the knifes 6 become worn it is necessary to adjust them in their support 88, and this is effected by turning the inner drum member 87 on the spigots 85 and 86. Such movement of the drum member 87 relatively to the main drum member 80 is brought about by turning a screw 109 threaded in a lug 110 carried by the end piece 81 (Figures 6 and 7). The inner end of the screw 109 then thrusts before it an arcuate projection 111 which is carried by the inner drum member 87 and projects through an arcuate aperture 112 in the end piece 81. This slight movement of the inner drum member 87 about the axis of the main drum member 80 results in the walls of the slots 107 acting on the inner ends 108 of the two-armed levers 101 so as to turn the latter about their pivots 104 and simultaneously thrust the knives 6 slightly further outwards from their respective carriers 88. In the rotation of the knife drum as a whole, during the normal operation of the machine, the screw 109 bears continuously on the arcuate projection 111, so rotating the inner drum member 87 with the outer drum member 80.

The journals 83 and 84 of the knife drum are mounted in journal bearings carried by slots in the machine frame, the latter being disposed so as to enable the knife drum to be shifted a small distance towards, and away from, its cutting position. The sectional plan of Figure 8 shows one of these journal bearings, which bears the reference numeral 113, and it also shows the lower face 114 of the slot in which the journal bearing may be moved to shift the knife drum as aforesaid. Flanges 115 and 116 are formed on each journal bearing so as to maintain it axially in position with respect to the associated slot, the flanges engaging the side faces of the slot. The journal 83 is connected, as shown in Figure 8, by a dog clutch to a sprocket 117 through which the drum is rotated. The dog clutch comprises a member 118 splined to the journal 83 so as to rotate therewith while being free to move to-and-fro in the axial direction. The member 118 is formed with an annular groove 119 in which is located a crank 120 carried by a spindle 121 mounted in a cover 122. Outside the cover 122 the spindle 121 carries a handle 123. Therefore, by turning the handle, the crank 120 may be caused to move the member 118 either towards or away from a position in which dogs on its inner face engage associated dogs on the outer face of the sprocket 117. The latter rotates continuously while the electric motor 46 is in operation but the dog clutch just described enables the knife drum to be started or stopped at will while other parts of the machine are in operation. The sprocket 117 is connected by a chain 124 to a sprocket 125 indicated diagrammatically in Figure 2 and connected by a suitable train of gears to the shaft 42 (Figure 1). This chain drive permits of the small to-and-fro motion of the journal bearings 113 as aforesaid to bring about the movement of the knife drum towards and away from the tobacco mouthpiece. This movement is effected by mechanism shown particularly in Figures 1, 2 and 8. Referring first to Figure 2, a ratchet wheel 126, which may be turned either by mechanism to be described presently or by a handle 127, is mounted on a countershaft 128 carrying a pinion 129 in mesh with a gear wheel 130 mounted on a shaft 131 carrying a bevel wheel 132 which drives a bevel wheel 133 on a shaft 134 that extends across the machine and carries near each end bevel gears which respectively drive small vertical shafts 135 (Figure 2) and 136 (Figure 1). The bevel gear that drives the shaft 136 appears in Figure 1 and is designated 138. It meshes with a bevel gear 228 on the shaft 136 which, at its upper end, carries a bevel gear 229 in mesh with a bevel gear 230 mounted on a sleeve 139 having an internal screw thread which engages an external screw thread on a shaft 140. Similarly the small vertical shaft 135 has, at its lower end, a bevel gear 141 in mesh with the associated gear on the shaft 134 and, at its upper end, a bevel gear 142 in mesh with a bevel gear 143 on a sleeve 144 containing an internal screw thread engaging a screw thread on a shaft 145. The sleeves 139 (Figure 1) and 144 (Figure 2) are mounted so that they cannot undergo any axial movement. Therefore, when the shaft 134 is caused to turn as a result of the turning of the ratchet wheel 126 (Figure 2), the small vertical shafts 135 (Figure 2) and 136 (Figure 1) cause the shafts 145 and 140 to move longitudinally one way or the other according to the direction in which the ratchet wheel is turned and such movement is communicated to the journal bearings carrying the knife drum 1. Figure 8 shows the shaft 145 connected to the journal bearing 113 and the connection is a rigid connection so that the shaft 145 will not turn about its axis when the associated sleeve 144 turns. The connection between the shaft 140 and the journal bearing at the other end of the knife drum is precisely similar. The ratchet wheel 126 is preferably furnished with an index which registers with a scale to enable the operator to determine the precise position of the axis of the knife drum.

To remove the tobacco from the recesses 96 in the knife drum, the periphery of the drum, after passing the fixed jaw 5, travels past nozzles, at each end of the drum, through which blasts of air blow the tobacco out of the recesses. The nozzles are supplied through a pipe 146 from a blower 147 (Figure 3) driven by a belt 148 from a pulley 61 fixed to a pulley 62 driven by a belt 63 from a pulley 64 driven by the motor 46.

When the knives 6 have become blunt, it is necessary to re-sharpen them and this is effected by a grinding wheel (Figures 3, 8 and 9) mounted in the machine. This grinding wheel 150, during the grinding operation, is automatically moved to and fro across the width of the knife drum. In initiating the grinding operation the first step is precisely to determine the plane in which the grinding wheel is so to move to-and-fro, and then through the medium of the handle 127 and the mechanism described above, to move the knife drum away from the tobacco mouthpiece, defined by the jaws 3 and 4, to the position in which it is engaged by the grinding wheel 150, the knives 6 having first been actuated by the aforesaid screw 109 to cause them to project far enough outwards to enable them to be ground down to a predetermined diameter at which they are to start cutting after the grinding operation. When the grinding operation has been initiated automatic mechanism becomes operative for moving the knife drum axis in small steps towards the grinding wheel as the sharpening of the knives 6 progresses.

By turning a handle 151 carried by a shaft 152 mounted on a bed 153 which is traversed by a carriage 154 upon which the grinding wheel is mounted, the carriage 154 is caused to move along the bed 153. This is because the shaft 152 carries a gear wheel 155 in mesh with a gear wheel 156 (Figure 3) on a countershaft 157 carrying a gear wheel 158 in mesh with a gear wheel 159 on a shaft 160 bearing gear wheel 161 in mesh with a rack 162 on the carriage 154.

To initiate the grinding operation the handle 151 is turned in such a direction that the grinding wheel 150 is brought opposite a diamond dressing tool 163 (Figure 10) fixed to one side of the machine. The position of this diamond tool 163 determines the plane in which the grinding wheel 150 is to act on the knives. The tool is mounted so that it can be adjusted for wear. The grinding wheel 150 is caused manually to approach the diamond tool 163 by turning a handle 164 (Figures 3 and 9) mounted on a shaft carried by the carriage 154 and acting through mechanism, not shown and forming no part of the present invention, on a slide rest 165 mounted to move at right angles to the direction of movement of the carriage 154 and serving as a support by which the grinding wheel 150 is attached to the carriage 154. The slide rest 165 also carries a motor 166 for driving the grinding wheel 150 through the medium of pulley wheels 167 and 168 and a belt 169. Assuming that the motor 166 has been started the grinding wheel 150 is caused to traverse the diamond tool 163 by manual operation of the handle 151 so as to dress the grinding wheel. During this operation a dog clutch, comprising dog members 170 and 171, is disengaged, the member 171 being held against the action of a spring 172 (by a manually operated cam 173 acting on a flange 174) away from the dog member 170. The latter rotates continuously during the operation of the machine while the dog member 171 is splined to a shaft 175 by which the carriage 154 is automatically driven when required.

The knife drum, while still being rotated by the chain 124, is moved to the plane in which the grinding wheel 150 is to operate and when this has been done the cam 173 is moved so as to allow the spring 172 to cause the dog member 171 to engage the member 170. Thus, the shaft 175 is caused to rotate and this causes the carriage 154 to move backwards and forwards along the bed 153 through the medium of mechanism now to be described.

This mechanism comprises two bevel gears 180 and 181 freely mounted on the shaft 175. These bevel gears are formed respectively with dog teeth 182 and 183 arranged to be alternately engaged by similar teeth 184 and 185 on sleeves 186 and 187 splined to the shaft 175. The sleeves 186 and 187 are formed respectively with annual grooves 188 and 189 that are engaged by pins 190 and 191 (Figure 10) carried by levers 192 and 193 pivoted at fixed points 194 and 195. The upper ends of the levers 192 and 193 are pivotally connected to a horizontal bar 196 carrying two fixed abutments 197 and 198 between which a lever 199 projects. The lever 199 is pivotally mounted at a fixed point 200 and is formed with a lateral projection 201 having at its extremity a V-shaped surface 202. Let is be assumed that, as shown in Figure 9, the dog teeth 182 are in engagement with the dog teeth 184, while the dog teeth 185 are separated from the dog teeth 183. This results in the bevel gear 181 driving a bevel gear 203 with which it is in mesh. The bevel gear 203 is also in mesh with the bevel gear 180 but, as the latter at this time is free to rotate idly, the drive is transmitted through the bevel gear 181. Thus, the bevel gear 203, which is mounted on the aforesaid countershaft 169, turns the latter so as to move the carriage 154 and the grinding wheel 150 to the right as viewed in Figure 9. As the carriage 154 approaches the end of its stroke in this direction, a stop 204 carried thereby engages the upper end of the lever 199 and moves it to the right so that the V-shaped surface 202 is caused to snap past a similar V-shaped surface 205 on a plunger 206, which yields as a result of this action against a compression spring 207 interposed between the plunger and an abutment 208 at the remote end of a cylinder which contains the plunger 206 and the spring 207. As the lever 199 snaps from the position shown in Figure 9 to the opposite position in which the V-shaped surface 201 lies below the V-shaped surface 205, it engages the abutment 198 and shifts the horizontal bar 196 to the right carrying with it the upper ends of the levers 192 and 193 which, through the medium of the pins 190 and 191, shift the sleeves 186 and 187 to disengage the bevel gear 181 and engage the bevel gear 180. Thus, the bevel gear 203 is now driven by the shaft 175, not through the bevel gear 181, but through the bevel gear 180, so that the carriage 154 is driven in the reverse direction back towards the position shown in Figure 9. On reaching the end of this reverse stroke, a stop 209 engages the lever 199 and causes it to snap back to the position shown in Figure 9, the lever 199 engaging the abutment 197 so as to shift the horizontal bar 196 back to the position shown in Figure 9 in which the bevel gear 181 is effective and the bevel gear 180 is ineffective.

As the grinding of the knives proceeds it is necessary, as already mentioned, for the axis of the knife drum 1 to be caused to approach the grinding wheel. This is effected through the medium of the aforementioned ratchet wheel 126 which, in the operation of the grinding wheel 150, is caused by a pawl 210 to shift the journal bearings of the knife drum in the manner already described. The pawl 210 is pivoted at 211 to a lever 212 mounted to swing about the axis of the shaft 128. The lever 212 is connected by a link 213 to a lever 214 pivoted about a fixed point located just behind a shaft 175. As viewed in Figure 9 the lower end of the lever 214 is pivoted at 215 to an extension 216 of the plunger 206. Thus, as the lever 199 is caused to snap to-and-fro during the reciprocation of the grinding wheel 150, the lever 214 is caused to siwng to-and-fro, thus causing the pawl 210 to engage and shift in succession the ratchet teeth on the ratchet wheel 126. This proceeds until the knives have been ground down to the required diameter and at that point it is necessary for the movement to the knife drum 1 to cease. Therefore, the ratchet wheel 126 carries a cam member 217 which, at the point where the knives have been properly sharpened, engages the pawl 210 and lifts it about the pivot 211 so as to prevent its further engagment with the ratchet wheel 126. Thereupon the operator can stop the electric motor 166 for the grinding wheel 150, and also stop the traversing movement of the carriage 154 by actuating the dog clutch comprising the members 170 and 171. He then actuates the hand wheel 127 to return the axis of the knife drum to the operative position in which the knives can sever the tobacco. It will be appreciated also that the pawl 210 can easily be moved by hand away from the ratchet wheel 126 to enable the manual movement of the knife drum axis to take place in the opposite direction, towards the grinding wheel, for the grinding process.

It may be mentioned that the dog member 170 to which the shaft 175 is clutched as required, is mounted on a shaft 220 having at its outer end a worm wheel 221 (Figure 2) in mesh with a worm 222 carried by a shaft 223 bearing a bevel wheel 224. The bevel wheel 224 is in mesh with the bevel wheel 225 on a countershaft connected by gears 40 and 41 to the shaft 42 (Figure 1) carrying the pulley wheel 43 driven by the motor 46.

The machine is provided with a suction pump 226 driven by the belt 63 which may be connected by a flexible pipe (not shown) to a trough 227 beneath the grinding wheel 150 to remove the products of grinding.

I claim:

1. A machine for cutting leaf tobacco and the like comprising, in combination, a knife assembly mounted to rotate about a substantially horizontal axis and including a plurality of knives equidistantly distributed about said axis means for projecting the knives to increase the cutting diameter of the knife assembly, means on one side of said assembly for feeding tobacco thereto to be cut, mechanism on the other side of said assembly for grinding said knives, means for moving said knife assembly towards a position adjacent said feeding means for cutting tobacco and towards a second position adjacent said grinding mechanism for grinding said knives, and means for rotating said knife assembly in each said position.

2. A machine for cutting leaf tobacco and the like comprising, in combination, a knife assembly mounted to rotate about a substantially horizontal axis and including a plurality of knives distributed about said axis means for projecting the knives to increase the cutting diameter of the knife assembly, means on one side of said assembly for feeding tobacco thereto to be cut, mechanism on the other side of said assembly for grinding said knives, bearing members supporting said knife assembly and mounted for reciprocatory movement, a rotatable member, mechanism interposed between said rotatable member and said bearing members for moving said knife assembly towards a position adjacent said feeding means when said rotatable member is turned in one direction and towards a second position adjacent said grinding mechanism when said rotatable member is turned in the other direction, and means for rotating said knife assembly in each said position.

3. A machine for cutting leaf tobacco and the like comprising, in combination, a knife assembly mounted to rotate about a substantially horizontal axis and including a plurality of knives distributed about said axis, means for rotating said knife assembly about said axis, means on one side of said assembly for feeding tobacco thereto to be cut, a grinding wheel on the other side of said assembly, automatic mechanism for moving said grinding wheel to-and-fro parallel to said axis, positioning means for moving said knife assembly towards said tobacco feeding means and away from said grinding wheel and then away from said tobacco feeding means and towards said grinding wheel, and mechanism responsive to said automatic mechanism for actuating said positioning means to feed said knife assembly in small steps towards said grinding wheel during the operation of the latter.

4. A machine for cutting leaf tobacco and the like comprising, in combination, a knife assembly mounted to rotate about a substntially horizontal axis and including a plurality of knives distributed about said axis, means for rotating said knife assembly about said axis, means on one side of said assembly for feeding tobacco thereto to be cut, a grinding wheel on the other side of said assembly, automatic mechanism for moving said grinding wheel to-and-fro parallel to said axis, a fixed dressing tool for dressing said grinding wheel and locating the line along which said grinding wheel moves in said to-and-fro movement, manually operable means for moving said grinding wheel into engagement with said tool, positioning means for moving said knife assembly towards said tobacco feeding means and away from said grinding wheel and then away from said tobacco feeding means and towards said grinding wheel, and mechanism responsive to said automatic mechanism for actuating said positioning means to feed said knife assembly in small steps towards said grinding wheel during the operation of the latter.

5. A machine for cutting leaf tobacco and the like comprising, in combination, a knife assembly mounted to rotate about a substantially horizontal axis and including a plurality of knives substantially equidistantly distributed about said axis, said assembly further including mechanism inside the path traversed by the rotating knives and operative on all the knives for increasing simultaneously the radial distance of the cutting edges of said knives from said axis, means on one side of said assembly for feeding tobacco thereto to be cut, mechanism on the other side of said knife assembly for grinding said knives, means for moving said assembly away from said grinding mechanism and towards a position adjacent said feeding means for enabling said assembly to cut the tobacco and then away from said feeding means and towards a second position adjacent said grinding mechanism to enable said assembly to be sharpened, and means for rotating said knife assembly in each said position.

6. A machine for cutting leaf tobacco and the like comprising, in combination, a knife drum mounted to rotate about a horizontal axis and provided around its periphery with a substantial number of elements each presenting a clamping surface, clamp members allocated respectively to the surfaces, a cam associated with each clamp member for thrusting upon and maintaining same in clamping position, knives allocated respectively to the surfaces and maintained thereagainst by said clamp members, means for rotating said knife drum about said axis, means for feeding tobacco towards said knives to be severed by same, and members defining a mouthpiece through which the tobacco is presented to said knives, the distance between the cutting edges of adjacent knives being substantially equal to the maximum height of the mouthpiece in a direction tangential to the path of the knives during cutting, whereupon the tobacco is at all times being cut by one knife and one knife only, and means for simultaneously shifting the cutting edges of said knives further from their respective clamping devices.

7. A machine for cutting leaf tobacco and the like comprising, in combination, a knife assembly mounted to rotate about an axis and provided around said axis with clamping devices, knives allocated respectively to said devices, each knife having its faces held by its respective clamping device, said assembly further comprising levers operatively associated with the edges of said knives remote from their cutting edges, means for rotating said knife assembly about said axis and means for actuating said levers for simultaneously shifting the cutting edges of a plurality of said knives further from their respective clamping devices.

8. A machine for cutting leaf tobacco and the like, comprising, in combination, a drum, means distributed around the periphery of said drum for holding knives substantially tangentially of the drum, knives mounted in said holding means, a second drum mounted within said first-mentioned drum, levers interposed between said knives and said second drum, means for rotating said second drum with respect to said first-mentioned drum to actuate said levers to increase the distance between the cutting edge of each knife and its respective holding means, means for rotating both said drums as a unit, and means for feeding tobacco towards the path traversed by said knives to be severed by same.

9. A machine for cutting leaf tobacco and the like comprising, in combination, rotatable knife mechanism for cutting tobacco, and means for feeding leaf tobacco and the like towards said knife mechanism, said means comprising upper and lower jaws adjacent said knife mechanism and upper and lower endless feed bands for feeding tobacco towards said jaws, said upper jaw being mounted on parallel links constituting a parallelogram linkage arranged to swing about fixed points located in a substantially vertical plane including the axis of rotation of the knife assembly, means for urging said upper jaw towards said lower jaw, a roller for one end of said upper endless feed band mounted on said jaw, and a driving roller for the remote end of said upper endless feed band, said driving roller being mounted to move to-and-fro in response to the movements of said upper jaw.

10. Machine for cutting leaf tobacco and the like comprising, in combination, a knife drum mounted to rotate about a horizontal axis and provided around its periphery with a number of knife holding units each presenting a clamping surface, clamp members allocated respectively to the surfaces, closely spaced knives allocated respectively to the surfaces and mounted thereagainst by said clamp members, said knife holding units forming a continuous annular assembly around said drum, each of said clamp members being formed at one side with a slot adapted to receive and temporarily retain the tobacco severed by its associated knife, the slot being substantially wholly located, with respect to the direction of rotation, behind the cutting edge of the associated knife, means for rotating said knife drum about said axis and means for feeding tobacco towards said drum, and air jets so positioned at a suitable point beside said rotating drum as to expel the tobacco from said slots as they pass by the jets.

PATRICK QUINTIN ROBERT SCHREIBER.

REFERENCES CITED

The following references are of record in the file of this patent:

UNITED STATES PATENTS

| Number | Name | Date |
|---|---|---|
| 848,066 | Stewart | Mar. 26, 1907 |
| 939,770 | Williams | Nov. 9, 1909 |
| 1,445,218 | Koch | Feb. 13, 1923 |
| 1,769,870 | Traud | July 1, 1930 |
| 2,121,879 | Lorentz | June 28, 1938 |
| 2,182,900 | McIlvried | Dec. 12, 1939 |

FOREIGN PATENTS

| Number | Country | Date |
|---|---|---|
| 12.221 | Australia | 1928 |